(12) United States Patent
Akedo

(10) Patent No.: US 6,414,109 B1
(45) Date of Patent: Jul. 2, 2002

(54) PROCESS FOR PRODUCING TETRAHYDROFURAN POLYMER

(75) Inventor: Takaharu Akedo, Otsu (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 09/502,485

(22) Filed: Feb. 11, 2000

Related U.S. Application Data

(63) Continuation-in-part of application No. PCT/JP99/03081, filed on Jun. 9, 1999.

(30) Foreign Application Priority Data

Jun. 15, 1998 (JP) ............................................. 10-181351
Jun. 16, 1998 (JP) ............................................. 10-183295

(51) Int. Cl.$^7$ ........................ C08G 59/68; C08G 65/10; C07C 43/13
(52) U.S. Cl. ........................ 528/410; 502/210; 502/211; 502/254; 502/255; 502/515; 502/576; 568/617
(58) Field of Search ........................ 528/410; 568/617; 502/210, 211, 254, 255, 515, 516

(56) References Cited

U.S. PATENT DOCUMENTS

| | | | | | |
|---|---|---|---|---|---|
| 4,205,182 | A | * | 5/1980 | Izumi et al. | 502/210 X |
| 4,522,934 | A | * | 6/1985 | Shum et al. | 502/210 X |
| 4,568,775 | A | | 2/1986 | Aoshima et al. | 568/617 |
| 4,658,065 | A | | 4/1987 | Aoshima et al. | 568/617 X |
| 4,677,231 | A | | 6/1987 | Aoshima et al. | 568/617 |
| 4,792,627 | A | * | 12/1988 | Aoshima et al. | 568/617 X |
| 5,416,240 | A | | 5/1995 | Weyer et al. | 568/617 |
| 5,756,604 | A | * | 5/1998 | Nakaoka et al. | 528/410 X |
| 5,886,139 | A | * | 3/1999 | Yamamoto et al. | 528/410 |

FOREIGN PATENT DOCUMENTS

| | | |
|---|---|---|
| EP | 0 372 771 B1 | 6/1990 |
| EP | 0 675 146 A1 | 10/1995 |
| JP | 61-123627 A | 6/1986 |

* cited by examiner

*Primary Examiner*—Richard D. Lovering
(74) *Attorney, Agent, or Firm*—Pennie & Edmonds LLP

(57) ABSTRACT

Provided is a process for producing a tetrahydrofuran polymer using a heteropoly-acid catalyst wherein the content of Al in the heteropoly-acid is 4 ppm or less.

5 Claims, No Drawings

PROCESS FOR PRODUCING TETRAHYDROFURAN POLYMER

CROSS-REFERENCE

The present application is a continuation-in-part of international application PCT/JP99/03081, filed Jun. 9, 1999, designating US, the content of which is herein incorporated by reference.

The present application relies for priority upon the inventor's Japanese Patent Application Nos. 10-181351, filed Jun. 15, 1998, and 10-183295, filed Jun. 16, 1998, the contents of which are herein incorporated by reference.

TECHNICAL FIELD

The present invention relates to a process for producing polymers of tetrahydrofuran (hereinafter referred to as "THF") using a heteropoly-acid as a catalyst.

More particularly, the present invention relates to a process for producing polyether glycols containing a THF polymer (homopolymer or copolymer of THF) using as a catalyst a specific compound, namely, a heteropoly-acid low in contents of Al, Cr and free phosphoric acid.

BACKGROUND ART

Polyether glycols are industrially useful polymers used as main starting materials of polyurethane used for polyurethane elastic fibers (spandex) and synthetic leathers, additives for oils, softening agents, etc.

U.S. Pat. Nos. 4,568,775, 4,658,065 and 5,416,240 disclose that heteropoly-acids can be utilized as polymerization catalysts in production of polyether glycols, especially, polyether glycols containing THF polymers. These patents make mention of amount of crystal water in heteropoly-acids and activity of the catalysts.

Moreover, U.S. Pat. No. 4,677,231 discloses a method for removal of heteropoly-acid catalysts.

When THF is polymerized using the same kind of heteropoly-acids under the same conditions, sometimes the catalytic performance of heteropoly-acids differ depending on the difference in production lots of heteropoly-acids. For example, reaction conversion rate of THF to polymers and stability in molecular weight of the polymers differ due to the difference in production lots of heteropoly-acids.

If the reaction conversion rate is low, large energy is consumed in polymerization of THF, and this is not economically preferred.

If the amount of the heteropoly-acid catalyst remaining in the THF polymer is large, the THF polymer is depolymerized due to heating or the like, and molecular weight of the THF polymer changes with time.

Adsorbents or the like are used for the removal of the heteropoly-acid catalyst remaining in THF, but since break through time of adsorbents gradually shortens, the adsorbents must be frequently changed. Therefore, this method is not preferred from both the economical viewpoint and the viewpoint of increase of industrial wastes.

DISCLOSURE OF INVENTION

An object of the present invention is to provide a process for polymerization of THF using a heteropoly-acid catalyst of high performance in production of THF polymers using heteropoly-acid catalysts.

Another object of the present invention is to provide a process for polymerization of THF using a heteropoly-acid which does not change in catalytic performance irrespective of difference in production lots of the heteropoly-acid.

Still another object of the present invention is to provide a process for polymerization of THF using a heteropoly-acid catalyst which is high in reaction conversion rate.

Further object of the present invention is to provide a process for polymerization of THF using a heteropoly-acid catalyst which is low in its residual amount in the THF polymers.

The present invention is a process for producing tetrahydrofuran polymers using a heteropoly-acid catalyst wherein the content of Al of the heteropoly-acid is 4 ppm or less.

Furthermore, the present invention is a process for producing tetrahydrofuran polymers using a heteropoly-acid catalyst wherein the heteropoly-acid is a heteropolyphosphoric acid containing 1 mol % or less of free phosphoric acid.

THF polymers can be produced with high reaction conversion rate and in a high yield by polymerizing THF using as a catalyst a heteropoly-acid lowered in the content of Al element according to the present invention. Furthermore, polymers free from coloration and having an APHA of less than 50 can be obtained by reducing the content of Cr element.

THF polymers less in the amount of heteropolyphosphoric acid remaining therein can be produced by polymerizing THF using a heteropolyphosphoric acid reduced in content of free phosphoric acid as a catalyst, and THF polymers can be produced with high reaction conversion rate by using the catalyst less in content of Al.

BEST MODE FOR CARRYING OUT THE INVENTION

The heteropoly-acids used as catalysts contain impurities such as various metal elements resulting from raw ores.

For stable production of heteropolyphosphoric acid which is a kind of heteropoly-acid, phosphoric acid is used excessively. As a result, the heteropolyphosphoric acid obtained contains free phosphoric acid which does not contribute to the formation of crystal structure effective as a polymerization catalyst for THF.

The present inventors have paid attention to the impurity metal elements and free phosphoric acid in heteropoly-acids and investigated the relation between contents of metal elements and free phosphoric acid and catalytic performance, and, as a result, accomplished the present invention.

Since the content of metal elements in commercially available heteropoly-acids is slight, namely, less than 20 ppm., the relation between the kind and content of the impurities and polymerization behavior of THF has not been hitherto taken into consideration. However, as a result of investigation of the effect of the impurity metal elements in heteropoly-acids on reaction conversion rate of ring opening polymerization of THF, it has been surprisingly found that a specific compound greatly affects the catalytic performance of heteropoly-acids. It has been found that, especially, Al and free phosphoric acid have a great influence on the catalytic performance.

When a large amount of Al is contained in the heteropoly-acid, the reaction conversion rate of THF is lowered. Though the cause therefor is not clear, it is presumed that (1) the resulting THF polymer contains an inorganic acid salt or reacts with the inorganic acid salt to form a kind of organometallic compound, which covers the surface of the heteropoly-acid, and, as a result, the catalytic activity is deteriorated, or (2) Al is dissolved in some form in the heteropoly-acid and, as a result, a Keggin structure which has a strong interaction with THF and is effective as a polymerization catalyst changes to a Dawson structure which has a weak interaction with THF, resulting in reduction of the proportion of the Keggin structure.

This problem is solved by adjusting the content of Al in the heteropoly-acid to 4 ppm or less, and a stable and high reaction conversion rate can be realized.

A solid heteropoly-acid recognizes the polarity of a molecule, and adsorbs the molecule to the surface of the heteropoly-acid or takes the molecule into the crystal of the heteropoly-acid. This property is also seen in catalytic reaction, and it is considered that the ring opening polymerization reaction of THF includes a reaction taking place on the surface of the heteropoly-acid catalyst and a reaction in which the inside of the crystal also participates (bulk reaction). The latter reaction is a phenomenon which is not seen in the conventional solid catalyst reaction and it is one of the specific properties of heteropoly-acids as catalysts.

It is presumed that in the case of using a heteropoly-acid catalyst as a liquid phase, the participation of the bulk reaction is great, but when Al as an impurity is present in an amount exceeding 4 ppm, Al incorporates into the crystal structure of the heteropoly-acid to hinder the bulk reaction. Thus, it is presumed that the coordination of THF to the heteropoly-acid catalyst through water is hindered and, as a result, the reaction conversion rate in ring opening polymerization of THF is deteriorated.

When the Al content of the heteropoly-acid is 4 ppm or less, stable and high reaction conversion rate can be obtained in the ring opening polymerization of THF. Therefore, the Al content of the heteropoly-acid is 4 ppm or less, preferably 2 ppm or less.

In the ring opening polymerization of THF, the lower Cr content of the heteropoly-acid is preferred. If the Cr content of the heteropoly-acid is high, the heteropoly-acid is colored, and when this is used as a catalyst, the resulting polymer is also sometimes colored.

When the Cr content of the heteropoly-acid is 1 ppm or less, the heteropoly-acid is not colored, and the resulting THF polymer is also not colored and is transparent.

The Cr content of the heteropoly-acid is 1 ppm or less, preferably 0.8 ppm or less.

For the production of heteropoly-acid low in Al and Cr contents, an extraction process using ether is known. For example, in the case of tungsten- or molybdenum-based heteropolyphosphoric acid, an excess amount of an inorganic acid is added to a mixed aqueous solution of an alkali phosphate or phosphoric acid and an alkali tungstate (or an alkali molybdate) under heating and stirring to prepare a tungsten-based (or molybdenum-based) heteropolyphosphoric acid, followed by extraction with ether to obtain the heteropolyphosphoric acid being separated from the salt and the inorganic acid. However, this process includes no purification step and the resulting heteropoly-acid contains impurities.

The heteropoly-acid suitable as THF polymerization catalyst used in the present invention can be produced by the above process or other known process using raw ores containing less impurities, or by purifying a heteropoly-acid obtained by the known process, by recrystallization or the like.

Al and Cr contents of the heteropoly-acid can be measured, for example, by a known method such as X-ray fluorescence method and atomic absorption spectrometry.

Another impurity content which greatly affects the catalytic performance of heteropoly-acid is the free phosphoric acid content of the heteropolyphosphoric acid. By using a heteropolyphosphoric acid of 1 mol % or less in free phosphoric acid content as a catalyst, residual catalyst in the resulting THF polymer can be reduced and depolymerization of the THF polymer can be inhibited.

If the amount of free phosphoric acid in the heteropolyphosphoric acid exceeds 1 mol %, the solubility of the heteropolyphosphoric acid in polyether glycol increases, and the amount of the catalyst remaining in the resulting polyether glycol increases. If the amount of the remaining catalyst increases, when polyether glycol is exposed to high temperatures at the purification step of it or at the dehydration step in the case of supplying it as a reactant or when it is stored for a long term, the depolymerization of the polymerization product of THF occurs. As a result, its molecular weight and molecular weight distribution change and the desired polyether glycol cannot be obtained.

Therefore, the catalyst in the polyether glycol must be removed before the polyether glycol is treated at high temperatures. The remaining catalyst can be removed by adsorption to active carbon, but the active carbon must be changed frequently and such a method of removal is not economical.

U.S. Pat. No. 4,677,231 discloses that heteropolyphosphoric acid used as a catalyst can be efficiently separated by adding a hydrocarbon or halogenated hydrocarbon of 15 or less carbon atoms which has a boiling point higher than THF and produces no azeotropic mixture, to a mixture obtained by the polymerization of THF and mainly composed of polyether glycol and THF. By using this method, a reaction product obtained using heteropolyphosphoric acid containing 1 mol % or less of free phosphoric acid as a polymerization catalyst for THF can be efficiently separated.

As the hydrocarbons or halogenated hydrocarbons of 15 or less carbon atoms used for precipitation and separation of the heteropolyphosphoric acid catalyst, mention may be made of, for example, n-heptane, octane, nonane, decane, undecane, dodecane, cyclooctane, 1-chlorooctane, chlorocyclohexane, and chlorotoluene. Among them, solvents for heteropoly-acids such as n-heptane, octane, nonane, decane, undecane and dodecane are preferred because these have a high function to precipitate heteropoly-acids.

Solvents of more than 16 carbon atoms are high in boiling point and cannot be easily separated and recovered from polyether glycol.

Amount of the solvent used for precipitation and separation of heteropolyphosphoric acid varies depending on the amount of the coexisting THF, but is usually 1–50 times, preferably 2–20 times the weight of THF. Regarding polyether glycol, the solvent is added in an amount necessary to cause a phase separation between polyether glycol and the solvent after removal of THF, and it is added in an amount of usually 0.5–50 times, preferably 1.0–20 times the weight of polyether glycol.

After addition of the solvent, mixing is carried out by a known stirrer and thereafter the mixture is separated into a phase consisting of or mainly composed of heteropolyphosphoric acid and a phase containing substantially no heteropolyphosphoric acid and containing polyether glycol by a known method, for example, by leaving it to stand.

Temperature for mixing and phase separation (precipitation of catalyst) is in a range where polyether glycol does not coagulate and operation can be easily performed.

In order to shorten the time required for the phase separation, there may be utilized filtration by a coalescer, a liquid cyclone, a centrifugal separator or a filter.

By adjusting the content of free phosphoric acid in the heteropolyphosphoric acid to 1 mol % or less in the process of the present invention, when the heteropolyphosphoric acid is used as a polymerization catalyst for THF, the solubility of the heteropolyphosphoric acid in the THF polymer can be made lower, and the heteropolyphosphoric acid can be efficiently removed from the polymerization product.

The reason therefor is not clear, but it is considered that phosphoric acid added excessively in the stage of the production of heteropolyphosphoric acid dissolves or penetrates into the crystal structure, resulting in change of solubility in the polymerization product.

When THF is polymerized using as a catalyst a heteropolyphosphoric acid of 1 mol % or less in the content of free phosphoric acid and of 4 ppm or less in Al content, both of the above effects can be attained.

It is further preferred to use as a catalyst a heteropolyphosphoric acid of 1 mol % or less in the content of free phosphoric acid, 4 ppm or less in Al content and 1 ppm or less in Cr content.

Heteropolyphosphoric acid suitable as a THF polymerization catalyst used in the present invention can be obtained by purifying a heteropolyphosphoric acid obtained by a known method, by recrystallization or the like.

In the present invention, polyether glycol can be produced by homopolymerization of THF or copolymerization of THF with a comonomer such as cyclic ether or diol copolymerizable with THF.

As examples of the comonomer, mention may be made of cyclic ethers such as oxetane and oxetane derivatives, for example, 3,3-dimethyloxetane, methyltetrahydrofuran, 1,3-dioxolan and tetrahydropyran, and/or ethylene glycol, propylene glycol, 1,3-propanediol, 1,3-butanediol, 1,5-pentanediol, 1,6-hexanediol, neopentyl glycol, diethylene glycol, and dipropylene glycol.

The heteropoly-acid used in the present invention is a general term for-oxy acids produced by bonding of at least one oxide selected from the group consisting of Mo, W and V to an oxy acid of other elements (such as P, As and Ge), and preferred are those which have an atomic ratio of the former to the latter of 2.5–12.

Typical examples of these heteropoly-acids are heteropolyphosphoric acids such as phosphomolybdic acid, phosphotungstic acid, phosphomolybdotungstic acid, phosphomolybdovanadic acid, phosphomolybdotungstovanadic acid, phosphotungstovanadic acid and phosphomolybdoniobic acid, germanotungstic acid, arsenomolybdic acid, and arsenotungstic acid.

Amount of the heteropoly-acid used is not limited, but if the amount of the heteropoly-acid in the reaction system is small, the polymerization rate is slow. Therefore, it is-used in an amount of preferably 0.1–20 times, more preferably 0.5–5 times the weight of the monomer.

When polymerization temperature of THF is high, the polymerization degree tends to lower due to occurrence of depolymerization of the polymer. The polymerization temperature is preferably 0–150° C., more preferably 30–80° C.

Reaction time varies depending on the amount of catalyst and the reaction temperature, but is usually 0.5–20 hours.

Since the polymerization reaction can be carried out with stirring the monomer and the heteropoly-acid, no solvent is particularly needed, but if necessary, a solvent inert to the reaction may be added.

The present invention will be explained in more detail by the following examples, but these examples never limit the invention.

EXAMPLES 1–5

200 Grams of THF containing 300 ppm of water was charged into a vessel of 300 ml equipped with a stirrer and a reflux condenser, followed by adding thereto 100 g of a heteropoly-acid whose coordination number of water was adjusted by heating at 180° C. in an electric furnace. Al content, Cr content and content of free phosphoric acid in this heteropoly-acid are shown in Table 1. The Al and Cr contents were measured by X-ray fluorescence analysis and the content of free phosphoric acid was measured by $^{31}$P-NMR using sodium phosphate as an external standard. The reaction temperature was set at 60° C., and stirring was continued for 4 hours, followed by leaving at room temperature to separate the catalyst phase of the lower layer. Unreacted THF was removed from the upper layer by distillation to obtain transparent and viscous polytetramethylene ether glycol (PTMG). Number-average molecular weight ($\overline{Mn}$) obtained by measuring OH value, reaction conversion rate and hue (APHA) are also shown in Table 1.

The reaction conversion rate was obtained by dividing the amount of the produced PTMG by the amount of the charged THF.

Comparative Examples 1 and 2

THF was polymerized in the same manner as in Example 1, using phosphotungstic acid of more than 4 ppm in Al content and more than 1 ppm in Cr content. Number-average molecular weight, reaction conversion rate and hue (APHA) of the resulting PTMG are shown in Table 1.

When THF was polymerized using a heteropolyacid of more than 4 ppm in Al content, the reaction conversion rate was low, and when THF was polymerized using a heteropoly-acid of more than 1 ppm in Cr content, the resulting polyether diol was colored and had an APHA of more than 50.

EXAMPLES 6–9

In the same manner as in Example 1, 200 g of THF containing 300 ppm of water was charged into a vessel of 300 ml equipped with a stirrer and a reflux condenser, followed by adding thereto 100 g of a heteropolyphosphoric acid whose coordination number of water was adjusted by heating at 180° C. in an electric furnace. Al content, content of free phosphoric acid and coordinated water in this heteropolyphosphoric acid are shown in Table 2. The reaction temperature was set at 60° C., and stirring was continued for 5 hours, followed by leaving at room temperature to separate the catalyst phase of the lower layer. Unreacted THF was removed from the upper layer by distillation. The residue was concentrated to about 50% and 1.25 times in volume of n-octane was added, followed by leaving at 40° C. for 4 hours and filtering through a Teflon filter of 0.2 μm in average pore diameter to separate the catalyst phase. Amount of the catalyst in the filtrate was analyzed, and the results are shown in Table 2.

The number-average molecular weight ($\overline{Mn}$) obtained by measuring OH value of the PTMG, and the reaction conversion rate are also shown in Table 2.

Comparative Examples 3 and 4

THF was polymerized in the same manner as in Example 6, using the heteropolyphosphoric acid shown in Table 2.

When filtration was carried out by the Teflon filter of 0.2 μm in average pore diameter, the inlet pressure of the filtration reached 15 times in about 5 hours. The filtrate was a transparent liquid, but the content of the remaining catalyst was high, namely, more than 50 ppm as shown in Table 2. When the pore diameter of the filter was 1 μm, substantially no increase of pressure was recognized, but the filtrate was not transparent but became somewhat cloudy.

Industrial Field of Application

The invention is useful for the production of polyether glycols used as main starting materials of polyurethane used for polyurethane elastic fibers (spandex) and synthetic leathers, additives for oils, softening agents, etc.

TABLE 1

| | | Heteropoly-acid | | | | Reaction | | |
| --- | --- | --- | --- | --- | --- | --- | --- | --- |
| | | Al | Cr | Free $H_3PO_4$ | Coordinated water | PTMG $\overline{Mn}$ | conversion rate | Hue (APHA) |
| Example 1 | Phosphotungstic acid | 3.0 ppm | 0.9 ppm | 1.5 mol % | 4 mol % | 1600 | 20.0% | 10 |
| Example 2 | Phosphotungstic acid | 2.0 ppm | 3.5 ppm | 1.4 mol % | 4 mol % | 1600 | 20.5% | 60 |
| Comparative Example 1 | Phosphotungstic acid | 16 ppm | 1.0 ppm | 4.7 mol % | 4 mol % | 1600 | 12.0% | 15 |
| Comparative Example 2 | Phosphotungstic acid | 540 ppm | 2.0 ppm | 12.7 mol % | 4 mol % | 1600 | 9.0% | 50 |
| Example 3 | Phosphomolybdic acid | 4.0 ppm | 1.0 ppm | 2.0 mol % | 10 mol % | 1500 | 18.5% | 10 |
| Example 4 | Silicomolybdic acid | 3.0 ppm | 0.7 ppm | ND* | 10 mol % | 1500 | 18.0% | 10 |
| Example 5 | Silicotungstic acid | 3.0 ppm | 0.9 ppm | ND | 10 mol % | 1500 | 19.0% | 15 |

*Not detected

TABLE 2

| | | Heteropoly-acid | | | | | |
| --- | --- | --- | --- | --- | --- | --- | --- |
| | | Al | Free phosphoric acid | Coordinated water | PTMG $\overline{Mn}$ | Reaction conversion rate | Remaining catalyst |
| Example 6 | Phosphotungstic acid | 3.0 ppm | 0.9 mol % | 6 | 1490 | 20% | 16 ppm |
| Example 7 | Phosphotungstic acid | 12 ppm | 1.0 mol % | 4 | 1605 | 14% | 30 ppm |
| Comparative Example 3 | Phosphotungstic acid | 16 ppm | 2.35 mol % | 6 | 1500 | 11% | 94 ppm |
| Comparative Example 4 | Phosphotungstic acid | 2.5 ppm | 6.35 mol % | 6 | 1510 | 18% | 155 ppm |
| Example 8 | Phosphomolybdic acid | 4.0 ppm | 0.7 mol % | 10 | 1595 | 19% | 15 ppm |
| Example 9 | Phosphomolybdic acid | 6.0 ppm | 0.9 mol % | 10 | 1600 | 12% | 12 ppm |

What is claimed is:

1. A process for producing a tetrahydrofuran polymer using a heteropoly-acid catalyst at a polymerization temperature of 0–150° C. and a reaction time of 0.5–20 hours, wherein the content of Al in the heteropoly-acid is 4 ppm or less.

2. A process according to claim 1, wherein the content of Cr in the heteropoly-acid is 1 ppm or less.

3. A process for producing a tetrahydrofuran polymer using a heteropoly-acid catalyst wherein said heteropoly-acid is a heteropolyphosphoric acid containing 1 mol % or less of free phosphoric acid, and used at a polymerization temperature of 0–150° C. and a reaction time of 0.5–20 hours.

4. A process according to claim 3, wherein the content of Al in the heteropolyphosphoric acid is 4 ppm or less.

5. A process according to claim 4, wherein the content of Cr in the heteropolyphosphoric acid is 1 ppm or less.

* * * * *